US012617381B2

(12) United States Patent
Sasso et al.

(10) Patent No.: US 12,617,381 B2
(45) Date of Patent: May 5, 2026

(54) BRAKING SYSTEM INCLUDING AT LEAST ONE PARKING BRAKE

(71) Applicants:Hitachi Astemo France, Drancy (FR); HITACHI ASTEMO HEILBRONN GmbH, Heilbronn (FR)

(72) Inventors: Julien Sasso, Champs Sur Marne (FR); Maxime Demandre, Stuttgart (DE); Weiqiao Wang, Paris (FR); Alex Patrao Carqueijo, Pantin (FR)

(73) Assignees: Astemo France, Drancy (FR); Astemo Heilbronn GmbH, Heilbronn (DE)

( * ) Notice: Subject to any disclaimer, the term of this patent is extended or adjusted under 35 U.S.C. 154(b) by 173 days.

(21) Appl. No.: 18/374,144

(22) Filed: Sep. 28, 2023

(65) Prior Publication Data

US 2024/0101085 A1     Mar. 28, 2024

(30) Foreign Application Priority Data

Sep. 28, 2022    (FR) ...................................... 2209846

(51) Int. Cl.
| | |
|---|---|
| *B60T 8/24* | (2006.01) |
| *B60T 7/02* | (2006.01) |
| *B60T 7/12* | (2006.01) |
| *B60T 13/74* | (2006.01) |

(52) U.S. Cl.
CPC ................ *B60T 8/245* (2013.01); *B60T 7/02* (2013.01); *B60T 7/12* (2013.01); *B60T 13/746* (2013.01); *B60T 2210/36* (2013.01); *B60T 2250/00* (2013.01)

(58) Field of Classification Search
CPC ... B60T 8/245; B60T 7/02; B60T 7/12; B60T 13/746; B60T 2210/36; B60T 2250/00; B60T 13/741; B60T 2201/06
See application file for complete search history.

(56) References Cited

U.S. PATENT DOCUMENTS

| | | | | |
|---|---|---|---|---|
| 9,242,624 | B2 * | 1/2016 | Huennekens | ........... B60T 17/22 |
| 9,592,798 | B2 * | 3/2017 | Lee | ........................... B60T 7/12 |
| 2020/0269824 | A1 * | 8/2020 | Witte | ...................... B60T 1/065 |
| 2021/0001836 | A1 * | 1/2021 | Witte | .............. B60W 30/18118 |
| 2022/0274577 | A1 * | 9/2022 | Pilzweger | ................. B60L 7/24 |

OTHER PUBLICATIONS

French International Search Report for FR 2209846, dated Mar. 23, 2023.

* cited by examiner

*Primary Examiner* — Xiao En Mo
(74) *Attorney, Agent, or Firm* — Wissing Miller LLP

(57) ABSTRACT

A motor vehicle braking system including at least one electrically actuated parking brake (FP) to be positioned at a wheel, a control unit (UC) configured for generating a command for the parking brake (FP) to apply parking braking or to interrupt the application of parking braking at a first intensity following a first request, wherein the control unit (UC) is also configured for generating a command for the parking brake (FP) to apply parking braking at a second intensity in response to a second request issued after the first request.

10 Claims, 2 Drawing Sheets

100

200

300

400

100'

200'

300'

400'

BRAKING SYSTEM INCLUDING AT LEAST ONE PARKING BRAKE

This application claims priority benefits from French Patent Application No. 2209846, filed Sep. 28, 2022, the disclosure of which is incorporated herein by reference.

TECHNICAL FIELD AND PRIOR ART

The present invention relates to a braking system for a motor vehicle and to a method of operation of such a braking system.

Motor vehicles are equipped with a braking system with a brake at each wheel.

The braking system provides service braking, which allows the vehicle to be slowed down and stopped. Service braking is generally obtained by depressing a brake pedal. The service braking can be controlled automatically by a control unit, e.g. in the case where automatic speed regulation is desired.

The braking system also provides parking braking, which is intended for immobilizing the vehicle when the vehicle is parked. The parking brake can also be used as an emergency brake.

Until recently, the parking brake was actuated by the driver pulling on a brake lever connected directly to the rear wheel brakes by a cable, the greater the traction, the greater the level of parking braking. The driver could therefore modulate the level of braking of the parking brake.

Increasingly frequently, the parking brake is actuated by pressing a button which sends a signal to the control unit which activates electric motors.

The level of braking applied by the brakes during parking braking is set by the control unit according to the parking situation of the vehicle. When the vehicle is parked on horizontal ground, the level of braking is set at a first value, while when the vehicle is parked on a slope, the level of braking is set at a second value higher than the first value. The level of braking is permanently set throughout the parking phase of the vehicle and cannot be modified.

The inventors have identified that in certain parking situations it is desirable to be able to increase the level of braking. For example, when a vehicle is to be transported by a vehicle-carrier semi-trailer, the vehicle is mounted on the trailer and is parked horizontally or substantially horizontally. The parking brake is activated. With the vehicle being horizontal, the level of braking applied to the wheels is the level programmed for a vehicle parked on horizontal ground. However, it happens that on this type of trailer some vehicles are positioned at an inclination in order to optimize the number of vehicles transported. For this purpose, the trailer includes parts which can be tilted. The part of the trailer with vehicles is then tilted after the vehicle has been parked horizontally and the parking brake has been activated. As a result, the vehicle is parked on a slope and the level of braking is the level of a horizontal or substantially horizontal parking. There is therefrom a risk that the vehicle is not be sufficiently immobilized.

OUTLINE OF THE INVENTION

Therefore, a goal of the present application is to propose a braking system which does not have the aforementioned drawback.

The goal stated hereinabove is achieved by a braking system for motor vehicle, including at least one parking brake intended for being positioned at a wheel and a control unit intended for controlling the brake so as to provide parking braking, the control unit being configured so that, in response to a second request for applying a parking brake following a first request for applying a parking brake, the control unit sends an instruction to change the level of braking.

In one example of embodiment, the second request is formulated by the driver who considers that the level of braking in parking should be increased in anticipation of a change in inclination of the vehicle compared to the inclination taken into account in response to the first request.

In another example of embodiment, the second request is formulated by the control unit which anticipates that the inclination of the vehicle could change, e.g. if same is informed, e.g. via the satellite navigation system, that the vehicle is parked on a boat. The swell can change the parking inclination of the vehicle.

Advantageously, the first and second successive requests are issued in a given period of time.

One subject matter of the present invention is a braking system for a motor vehicle, including at least one electrically actuated parking brake intended for being positioned at a wheel, a control unit configured for generating a command for the parking brake to apply parking braking or to interrupt the application of parking braking at a first intensity in response to a first request. The control unit is also configured for generating a command for the parking brake to apply parking braking at a second intensity in response to a second request issued after the first request.

In one embodiment, the first request and the second request are issued by a driver of the motor vehicle by actuating a parking brake control.

In another example of embodiment, the first request and the second request are issued by the control unit, the first request being an automatic actuation of the parking brake when the motor vehicle is stopped.

In another example of embodiment, one of the first and second requests is issued by the control unit and the other of the requests is issued by the driver of the vehicle.

According to an additional feature, the parking brake is integrated into the service brake and includes a motor reduction gear.

Another subject matter of the present invention is a motor vehicle including four wheels and a braking system according to the invention, the braking system including two parking brakes, one for each rear wheel.

Another subject matter of the present invention is a method of operation of the braking system according to the invention, equipping a motor vehicle, wherein:

Following a parking of the motor vehicle on a parking space, a first request is issued to activate the parking brake at a first intensity, A command is sent to the parking brake which applies a parking braking force at the first intensity, The variable inclination of the parking space is detected, A second request is sent to apply a parking braking force at a second intensity, A command is sent to the parking brake which applies a braking force at the second intensity.

In one example of embodiment, the first request is issued by the driver or the control unit, and the second request is issued by the driver.

In another example of embodiment, the first request is sent by the driver or the control unit and the second request is sent by the control unit. The second request can be sent by the control unit following a consultation of a satellite navigation system.

BRIEF DESCRIPTION OF FIGURES

The following description will be better understood with reference to the enclosed drawings, wherein.

DETAILED DESCRIPTION OF EMBODIMENTS

Figure 1A:
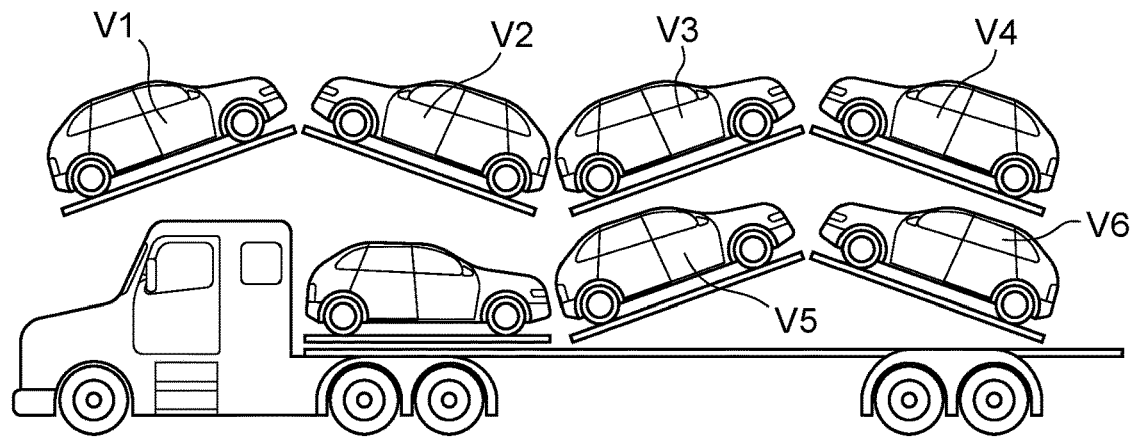
FIG. 1A is a schematic representation of an example of parking of the vehicle to which the present application applies.
Figure 1B:
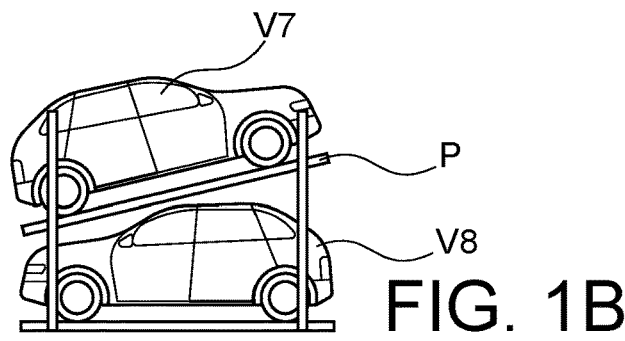
FIG. 1B is a schematic representation of another example of parking of the vehicle to which the present application applies.

FIGS. 1A and 1B show parking configurations for motor vehicles, to which the invention particularly applies.

FIG. 1A shows a truck including a trailer loaded with motor vehicles V. The trailer includes platforms; in order to optimize the number of vehicles which can be loaded, certain platforms are inclined. The vehicles V1, V2, V3, V4, V5 and V6 vehicles are tilted. The loading is done as follows. The vehicle is loaded on the trailer which has a moving platform. After parking the vehicle on the platform, the platform is tilted.

FIG. 1B shows a parking system with mechanized platform, for parking two vehicles V7, V8 stacked on the same place on the ground. The first V7 vehicle is parked on platform P; platform P rises and tilts forward, freeing up space for parking a second vehicle V8.

In both configurations, the vehicle is parked substantially horizontally, and the inclination thereof is then modified by an external event.

Figure 2:
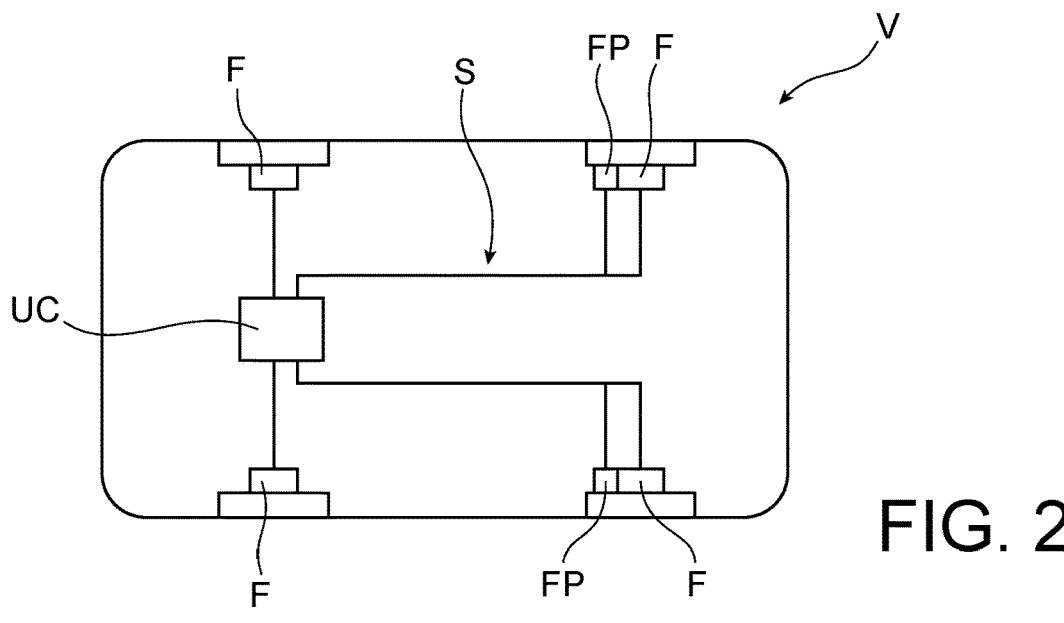
FIG. 2 is a representation of a braking system according to an example of embodiment.

A vehicle V, shown diagrammatically in FIG. 2, includes a braking system S comprising brakes F equipping each wheel.

Hydraulic brakes generally provide service braking.

The rear brakes F are equipped with a parking brake function FP, which are increasingly often electric. A motor reduction gear moves the brake pads against the disc or the brake linings against the drum. It is common for only the rear wheels to be equipped with parking brakes.

A braking system with four parking brakes and/or an electric service braking does not depart from the scope of the present application.

The braking system further includes a control unit UC intended for controlling in particular the actuation of the parking brakes FP.

Indeed, the electric parking brakes are actuated either by a command from the driver by actuating a button, generally in the form of a small lever, or any other means of control, e.g. a voice command, or automatically, e.g. upon stopping the engine. The signal is detected by the control unit which sends a command to the motor reduction gear of each parking brake FP to apply a braking force of intensity F1.

The means of control is e.g. a button with three positions: a neutral position wherein there is no control of the parking brake, a position for applying braking and a position for canceling the braking. The action of the driver on the means of control is thus different for the application of parking braking or for the cancellation of parking braking.

The control unit takes into account a first request issued by the driver or by the control unit as such, and generates a command to the motor reduction gears to exert a first parking braking force F1. The control unit takes into account the inclination of the vehicle parking to adjust the application force of the parking brakes. The more the parking space is tilted with respect to the horizontal, the higher the first braking force F1.

According to the invention, the control unit is further configured for being apt to take into account a second request sent either by the driver or by the control unit as such.

Figures 3, 4:
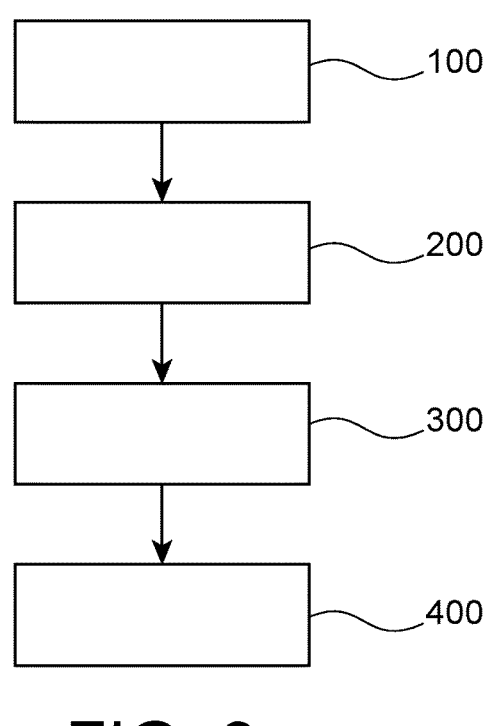
FIG. 3 represents a flowchart of an example of the operation of a braking system according to an example of embodiment.
FIG. 4 represents a flowchart of an example of operation of a braking system according to another example of embodiment.

FIG. 3 shows, schematically, a first embodiment of a braking system according to an example of embodiment of the invention.

The driver parks the vehicle and sends a first request by actuating the control of the parking brake during the step 100.

During the step 200, the control unit UC receives the first request and issues a command to the motor reduction gears of the parking brakes FP to apply a braking force F1.

During the step 300, the driver who anticipates that the inclination of the vehicle could or will change, e.g. because the vehicle is parked on a mechanized platform of a parking space, sends a second request, preferentially within a predetermined time.

During the step 400, the control unit UC receives the second request and issues a command to the motor reduction gear of the parking brakes FP to apply a braking force F2.

The value of F2 is predetermined and has been chosen taking into account the maximum inclination of such type of parking or loading device.

FIG. 4 shows, schematically, a second embodiment of a braking system according to an example of embodiment of the invention According to one embodiment, the first request and the second request are issued by the control unit UC.

During the step 100', the driver parks the vehicle and switches off the ignition. During step 200', the control unit which detects the switching off of the ignition sends a command to apply the parking brake at an intensity F1, which depends on the slope of the parking place.

During the step 300', the control unit UC, after applying the parking brake in response to the first request, checks whether the parking conditions are likely to change and to require additional brake application. For example, if the vehicle is parked in a boat, the inclination thereof could vary due to the swell.

Such parking condition is e.g. detected by the satellite navigation system which detects that the vehicle is parked on the water and is hence parked in or on a boat or a ferry.

During the step 400', if the control unit UC detects such an eventuality, same issues a second request and sends or issues a command to the motor reduction gears of the parking brakes to apply a braking force F3. The value F3 can be predetermined, considering a maximum tilt value for the boat, and can be pre-stored in the control unit memory. Alternatively, the value of F3 is chosen according to external parameters, e.g. meteorological conditions. For this purpose, the control unit is connected to the Internet and has access to a weather forecast service.

According to the invention, the driver or the user anticipates changes in the parking of the vehicle and adapts the braking force of the parking brake by providing for an increase in the inclination of the parking of the vehicle.

In another example of embodiment, the first request is issued by the control unit in automatic actuation mode of the parking brake and the second request is issued by the driver who anticipates that the inclination of the vehicle will change.

In another example of embodiment, the first request is issued by the driver and the second request is issued by the control unit.

In another example of embodiment, the first request is issued by the control unit in automatic actuation mode of the parking brake and the second request is also issued by the control unit.

The present invention offers the advantage of making it possible to adjust the level of braking as according to external parameters which could evolve and could allow the driver to intervene on the level of braking.

The invention claimed is:

1. A braking system for a motor vehicle on a parking space, the vehicle including at least one parking brake (FP) for immobilizing the vehicle on the parking space, wherein the parking space supports the vehicle at a changeable orientation when the motor vehicle is parked thereon, said parking brake having an electrical actuation intended for being positioned at a wheel, and a control unit (UC) that generates a first command to the parking brake (FP) to apply parking braking or to interrupt the application of parking braking at a first intensity (F1) following a first request corresponding to a first inclination of the motor vehicle, and wherein the control unit (UC) generates a second command to the parking brake (FP) to apply parking braking at a second intensity (F2) in response to a second request issued after the first request when a change in inclination of the motor vehicle with respect to the first inclination is predicted.

2. The braking system according to claim 1, wherein the first request and the second request are issued by a driver of the motor vehicle by actuating a parking brake control.

3. The braking system according to claim 2, wherein the first request and the second request are issued by the control unit (UC), the first request being an automatic actuation of the parking brake (FP) upon the stopping of the motor vehicle.

4. The braking system according to claim 1, wherein at least one of the first and second requests is issued by the control unit (UC) and the other of the requests is issued by the driver of the vehicle.

5. The braking system according to claim 1, wherein the parking brake (FP) is integrated into a service brake and includes a motor reduction gear.

6. A motor vehicle having four wheels and a braking system according to claim 1, wherein the braking system has two parking brakes (FP), one for each rear wheel.

7. A method of operation of the braking system fitted to a motor vehicle, wherein the braking system includes at least one parking brake (FP) for immobilizing the vehicle on a parking space, wherein said parking brake has an electrical actuation intended for being positioned at a wheel, and a control unit (UC) configured for generating a first command to the parking brake (FP) to apply parking braking or to interrupt the application of parking braking at a first intensity (F1) following a first request and for generating a second command to the parking brake (FP) to apply parking braking at a second intensity (F2) in response to a second request issued after the first request, the method comprising the steps of:

following parking of the motor vehicle on the parking space, issuing the first request to activate the parking brake at the first intensity (F1) corresponding to a first inclination of the motor vehicle, sending the first command to the parking brake (FP) which applies a parking braking force at the first intensity (F1), predicting a change in inclination of the parking space, sending the second request to apply the parking braking force at the second intensity (F2, F3), and applying the braking force at the second intensity (F2, F3).

8. The method of operation according to claim 7, wherein the first request is issued by the driver or the control unit, and the second request is issued by the driver.

9. The method of operation according to claim 7, wherein the first request is issued by the driver or the control unit and the second request is issued by the control unit.

10. The method of operation according to claim 9, wherein the second request is issued by the control unit following a consultation of a satellite navigation system.

* * * * *